United States Patent Office 3,149,128
Patented Sept. 15, 1964

3,149,128
NEW BENZO-1,3-DIOXOLE DERIVATIVES
John Nicholson Gardner, East Orange, N.J., and George Lawrence Willey, Harpenden, England, assignors to Smith Kline & French Laboratories, Philadelphia, Pa., a corporation of Pennsylvania
No Drawing. Filed Dec. 17, 1962, Ser. No. 244,895
Claims priority, application Great Britain Dec. 22, 1961
4 Claims. (Cl. 260—340.5)

This invention relates to new 1,3-benzodioxole-2-carbonyl urea and thiourea compounds having medicinal activity. These compounds have general pharmacodynamic activity and are more specifically CNS depressants. Also they have an effect on plant growth.

The compounds of this invention have for example the following structural formula:

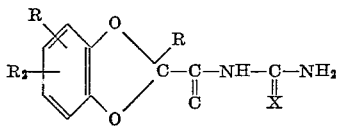

in which R, $R_1$ and $R_2$ are methyl or hydrogen and X is sulfur or preferably oxygen.

Other "inert" ring substituents may be present in place of the exemplary methyl group on the benzodioxole nucleus such as one or more halo, methoxy, ethoxy, ethyl, trifluoromethyl or methylthio substituents.

The compounds of this invention are prepared by reacting a 1,3-benzodioxole-2-carbonyl chloride with the desired urea or thiourea reactant. The starting materials are readily prepared from compounds as disclosed hereafter.

The following examples will illustrate this invention to one skilled in the art.

Example 1

Catechol (220 g.) is dissolved in ethanolic sodium ethoxide (from 92 g. of sodium and three liters of absolute ethanol) and ethyl dichloroacetate (314 g.) is added over one hour. The reaction mixture is heated under reflux for a further 6 hours and the ethanol then distilled off. Ether (1.2 l.) and 5% sodium bicarbonate solution (600 ml.) are added to the cooled residue and the ether is separated off and washed four times with 200 ml. of 5% sodium bicarbonate solution and then with 200 ml. of water. The ester 2-carbethoxy-1:3-benzodioxole (148 g.) is obtained from the ethereal solution and has a B.P. of 94–104° C./0.1 mm. (the product contained some catechol).

The ester (25 g.) is heated at 100° C. in a stream of nitrogen with aqueous ethanolic potassium hydroxide (15 g. in 150 cc. 50% ethanol) for an hour, the ethanol being allowed to evaporate. The solution is cooled, acidified with concentrated hydrochloric acid, and the precipitated 1,3-benzodioxole-2-carboxylic acid (12 g.) isolated and recrystallized from ether-light petroleum (B.P. 60–80° C.) to M.P. 112–113° C.

The above acid (3 g.) is refluxed with thionyl chloride (10 cc.) for 1 hour and the crude 1,3-benzodioxole-2-carbonylchloride obtained by evaporation of the excess thionyl chloride.

The above carbonylchloride in benzene (10 cc.) is added over 20 minutes to a stirred, refluxing suspension of urea (1.2 g.) in benzene (10 cc.). After a further 4 hours the reaction mixture is cooled, diluted with saturated sodium bicarbonate solution, and the precipitated solid isolated. The solid is washed with water and recrystallized from ethanol to yield 1,3-benzodioxole-2-carbonyl urea (1.3 g.) as needles M.P. 188–189° C.

Example 2

3-methylcatechol (1.13 kg.) in sodium ethoxide (420 g. sodium in 13.5 liters ethanol) and under nitrogen is treated over 4 hours with ethyldichloroacetate (1.130 liters). The reaction mixture is brought to reflux for 6 hours after which most of the ethanol is removed by distillation. The residue is cooled, dissolved in ether (6.5 liters) and the ethereal solution washed with 5% aqueous sodium bicarbonate (9×4 liters) followed by water (2×2 liters). The ethereal solution is dried over magnesium sulfate, the ether evaporated and the residue distilled to give 2 - carbethoxy - 4 - methyl-1,3-benzodioxole (740 g.). The product is freed from a little 3-methylcatechol by filtration of a benzene solution through alumina. The pure material has B.P. 92° C./0.3 mm. $[n]_D^{25}$ 1.5050.

The ester (70 g.) and aqueous KOH (23 g. in 250 cc. water) are heated on the steam bath in an atmosphere of nitrogen for 1 hour. The resultant solution is cooled on ice and acidified with concentrated hydrochloric acid. 4-methyl-1,3-benzodioxole-2-carboxylic acid (19.5 g.) is precipitated and after crystallization from benzene-light petroleum it was obtained as lathes M.P. 108–110° C.

The acid (2.1 g.) is heated at reflux with excess thionyl chloride for 1 hour and the excess evaporated to give crude 4 - methyl - 1,3 - benzodioxole - 2 - carbonylchloride. This in N,N-dimethylformamide (10 cc.) is added to a solution of urea (1 g.) in the same solvent (10 cc.). Pyridine (3 cc.) is added and the mixture heated at 100° C. for 2 hours then left overnight at room temperature. The solution is diluted with ethylacetate (50 cc.) and washed with 2 N hydrochloric acid, water, saturated sodium hydrogen carbonate solution and water. The dried solution is evaporated to give 4-methyl-1,3-benzodioxole-2-carbonyl urea (1.2 g.) needles M.P. 181–183° C. from benzene.

Repeating the acylation with thiourea gives 4-methyl-1,3-benzodioxole-2-carbonyl thiourea.

Example 3

3,6-dimethylcatechol (23.0 g.) in sodium ethoxide (9.6 g. sodium in 325 cc. ethanol) under an atmosphere of nitrogen is treated with ethyl dichloroacetate (32.8 g.) over 20 minutes. The mixture is then heated at reflux for 6 hours and stirred at room temperature for a further 8 hours after which most of the ethanol is distilled off. The residue is dissolved in ether (200 cc.), decanted from tar and the ethereal solution washed with 5% aqueous sodium bicarbonate. Evaporation of the ethereal solution and distillation of the residue gives an oil (8 g.) B.P. 90–130° C./0.1–0.4 mm. which is dissolved in benzene and filtered through alumina. Removal of the benzene and distillation of the residue gives pure 2-carbethoxy-4,7-dimethyl-1,3-benzodioxole (5 g.) B.P. 77–80° C./0.2 mm. $[n]_D^{27}$ 1.4991, M.P. 22–24° C. (after crystallization from methanol at −70° C.).

The ester (1.5 g.) is dissolved in ethanol (32 cc.) and 10% potassium hydroxide (20 cc.) air having been displaced from the solutions by a nitrogen stream. After heating at reflux for 2 hours the solution is cooled, diluted with water, acidified and the precipitated solid isolated. Crystallization of the solid from aqueous ethanol gives 4,7-dimethyl-1,3-benzodioxole-2-carboxylic acid (1.0 g.) M.P. 179–180° C.

The acid (0.75 g.) reacted as in Example 2 at reflux with thionyl chloride to give the carbonyl chloride which is divided into two portions then reacted with urea and thiourea respectively to give 4,7-dimethyl-1,3-benzodioxole-2-carbonyl urea and thiourea.

What is claimed is:
1. A compound of the formula:

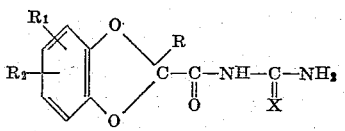

in which R, $R_1$ and $R_2$ are members selected from the group consisting of hydrogen and methyl; and X is a member selected from the group consisting of sulfur and oxygen.
2. 1,3-benzodioxole-2-carbonyl urea.
3. 4-methyl-1,3-benzodioxole-2-carbonyl urea.
4. 4,7-dimethyl-1,3-benzodioxole-2-carbonyl urea.

References Cited in the file of this patent
Burger et al.: J. Am. Chem. Soc., vol. 71, pp. 3307–10 (1949), QD1 A5 page 3308.